US010404545B2

(12) United States Patent
Kyllonen

(10) Patent No.: US 10,404,545 B2
(45) Date of Patent: Sep. 3, 2019

(54) NETWORK TOPOLOGY

(71) Applicant: Carrier Corporation, Farmington, CT (US)

(72) Inventor: Kimmo Antero Kyllonen, Shakopee, MN (US)

(73) Assignee: Carrier Corporation, Palm Beach Gardens, FL (US)

(*) Notice: Subject to any disclaimer, the term of this patent is extended or adjusted under 35 U.S.C. 154(b) by 141 days.

(21) Appl. No.: 15/533,722

(22) PCT Filed: Dec. 16, 2015

(86) PCT No.: PCT/US2015/065974
§ 371 (c)(1),
(2) Date: Jun. 7, 2017

(87) PCT Pub. No.: WO2016/100435
PCT Pub. Date: Jun. 23, 2016

(65) Prior Publication Data
US 2017/0366408 A1 Dec. 21, 2017

Related U.S. Application Data

(60) Provisional application No. 62/092,468, filed on Dec. 16, 2014.

(51) Int. Cl.
H04L 12/24 (2006.01)
H04L 29/08 (2006.01)
(Continued)

(52) U.S. Cl.
CPC ............ H04L 41/12 (2013.01); H04L 29/08 (2013.01); H04L 45/02 (2013.01); H04L 63/08 (2013.01); H04L 67/12 (2013.01); H04L 69/28 (2013.01)

(58) Field of Classification Search
None
See application file for complete search history.

(56) References Cited

U.S. PATENT DOCUMENTS 7,028,183 B2    4/2006  Simon et al.
7,436,775 B2   10/2008  Jordan et al.
(Continued)

FOREIGN PATENT DOCUMENTS

EP    2180642 A1    4/2010
EP    2615791 A1    7/2013

OTHER PUBLICATIONS

International Search Report and Written Opinion for International Appliction No. PCT/US2015/065974, dated Mar. 23, 2016.
(Continued)

Primary Examiner — Jeffrey R Swearingen
(74) Attorney, Agent, or Firm — Locke Lord LLP; Scott D. Wofsy; Judy R. Naamat

(57) ABSTRACT

A system for network topology includes a first edge router node and a plurality of first sensors operatively connected to the first edge router node. A second edge router node is operatively connected to the first edge router node and to the plurality of first sensors. A plurality of second sensors are operatively connected to the second edge router node and to the first edge router node. The first and second edge router nodes are operatively connected to a cloud server through a respective cloud connection, so that in the event of one of the cloud connections becoming unavailable the plurality of first and second sensors in the system can remain operatively connected to the cloud server through the remaining cloud connection.

19 Claims, 2 Drawing Sheets

(51) Int. Cl.
*H04L 29/06* (2006.01)
*H04L 12/751* (2013.01)

(56) References Cited

U.S. PATENT DOCUMENTS

| | | | |
|---|---|---|---|
| 7,586,879 | B2 | 9/2009 | Chari et al. |
| 7,684,316 | B2 | 3/2010 | Filsfils et al. |
| 8,320,388 | B2 | 11/2012 | Louati et al. |
| 8,532,108 | B2 | 9/2013 | Li et al. |
| 8,699,417 | B2 | 4/2014 | Liu et al. |
| 8,705,513 | B2 | 4/2014 | Van Der Merwe et al. |
| 9,501,916 | B2* | 11/2016 | Rasband ............... H04W 4/029 |
| 2013/0215810 | A1 | 8/2013 | Wang et al. |
| 2013/0297770 | A1 | 11/2013 | Zhang |
| 2013/0303188 | A1 | 11/2013 | Butala et al. |
| 2013/0311640 | A1* | 11/2013 | Gleixner ............... H04W 4/70 709/224 |
| 2014/0108132 | A1 | 4/2014 | De Gour |
| 2014/0118143 | A1 | 5/2014 | Monacos et al. |

OTHER PUBLICATIONS

Gupta, G., et al: "Fault-tolerant clustering of wireless sensor networks", 2003 IEEE Wireless Communications and Networking Conference Record: Mar. 16-20, 2003, New Orleans, Louisiana, USA, IEEE Operations Center, Piscataway, NJ, vol. 3, Mar. 16, 2003 (Mar. 16, 2003), pp. 1579-1584, XP010640005, DOI: 10.1109/WCNC.2003.1200622, ISBN: 978-0-7803-7700-4, the entire document.

Joach, I.M., et al: "Capillary networks a smart way to get things connected", Sep. 9, 2014 (Sep. 9, 2014), XP055257750, Stockholm, Sweden, Retrieved from the Internet: URL:http://www.ericsson.com/res/thecompany/docs/publications/ericsson_review/2014/er-capillary-networks.pdf [retrieved on Mar. 11, 2016], p. 3, col. 2, line 26 p. 4, col. 3, line 2; figures 1, 2.

* cited by examiner

NETWORK TOPOLOGY

CROSS-REFERENCE TO RELATED APPLICATIONS

This application is a 371 U.S. National Phase of International PCT Patent Application No. PCT/US2015/065974, filed Dec. 16, 2015, which claims the benefit of and priority to U.S. Provisional Patent Application No. 62/092,468, filed Dec. 16, 2014, the content of which is expressly incorporated herein by reference in its entirety.

BACKGROUND OF THE INVENTION

1. Field of the Invention

The present disclosure relates to communication networks, and more particularly communication network configurations.

2. Description of Related Art

The arrangement of a network of nodes and links is defined by a network topology. The network topology can determine the physical and logical interconnections between the network nodes, where each node has one or more links to one or more other nodes. The physical topology of a network is determined by the configuration of the physical connections between the nodes. The configuration can be represented by a multi-dimensional geometric shape, for example, a ring, a star, a line, a lattice, a hypercube, or a torus. The logical topology of a network is determined by the flow of data between the nodes.

Traditional network topologies typically have an edge router that is connected outside the system, e.g., to a cloud server. In addition, in certain applications like security and access systems, the nodes as well as edge router can only transmit 2 seconds per hour based on specific market and regulatory restrictions. This restricts the number of sensor nodes connected to a single edge router.

Such conventional methods and systems have generally been considered satisfactory for their intended purpose. However, there is still a need in the art for improved network topology. The present disclosure provides a solution for this need.

SUMMARY OF THE INVENTION

A system for network topology includes a first edge router node and a plurality of first sensors operatively connected to the first edge router node. A second edge router node is operatively connected to the first edge router node and to the plurality of first sensors. A plurality of second sensors are operatively connected to the second edge router node and to the first edge router node. The first and second edge router nodes are operatively connected to a cloud server through a respective cloud connection, so that in the event of one of the cloud connections becoming unavailable the plurality of first and second sensors in the system can remain operatively connected to the cloud server through the remaining cloud connection.

The plurality of first and second sensors can communicate with the first edge router node and the second edge router node using frequency bands having transmit time limitations. In certain embodiments, communication between sensor and edge router nodes occur in frequency bands without transmit time limitations when communication requiring wider bandwidth takes place. The first and second edge routers, can communicate using frequency bands without transmit time limitations. Communication through the cloud connections can be, but is not limited to, WiFi, Bluetooth, GPRS and PSTN. The first and second edge router nodes can be wall powered while the plurality of first and second sensors can be battery operated.

The system can further include a third edge router node operatively connected to the first and second edge router nodes and a plurality of third sensors operatively connected to the third edge router node and the first edge router node. In alternate embodiments, the system can include a third edge router node operatively connected to the first edge router node and to the cloud server and a plurality of third sensors operatively connected to the third edge router node and the first edge router node.

The first edge router node can be a main edge router node to the first plurality of sensors and the second edge router node can be an alternate edge router node to the first plurality of sensors. The second edge router node can be a main edge router node to the second plurality of sensors and the first edge router node can be an alternate edge router node to the second plurality of sensors.

A system for network topology includes a plurality of edge router nodes, including a first and second edge router node. The first and second edge router nodes are operatively connected to a cloud server. A plurality of sensors are operatively connected the edge router nodes, such that a portion of the plurality of sensors are operatively connected to the first and second edge router nodes such that the first and second edge router nodes have a wireless link to the portion of the plurality of sensors.

A network topology for a security and access authorization system includes at least two edge router nodes operatively connected together. At least one sensor is operatively connected to the at least two edge router nodes. A cloud server is operatively connected to the at least two edge router nodes and an alarm is operatively connected to the cloud server. Such that in the event of one of the cloud connections becoming unavailable the plurality of first and second sensors in the system can remain operatively connected to the cloud server through the remaining cloud connection.

The at least one sensor can sense a hazardous condition and can communicate the hazardous condition to the alarm through the edge router nodes and the cloud server.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, preferred embodiments thereof will be described in detail herein below with reference to certain figures, wherein.

DETAILED DESCRIPTION OF THE PREFERRED EMBODIMENTS

Figure 1:
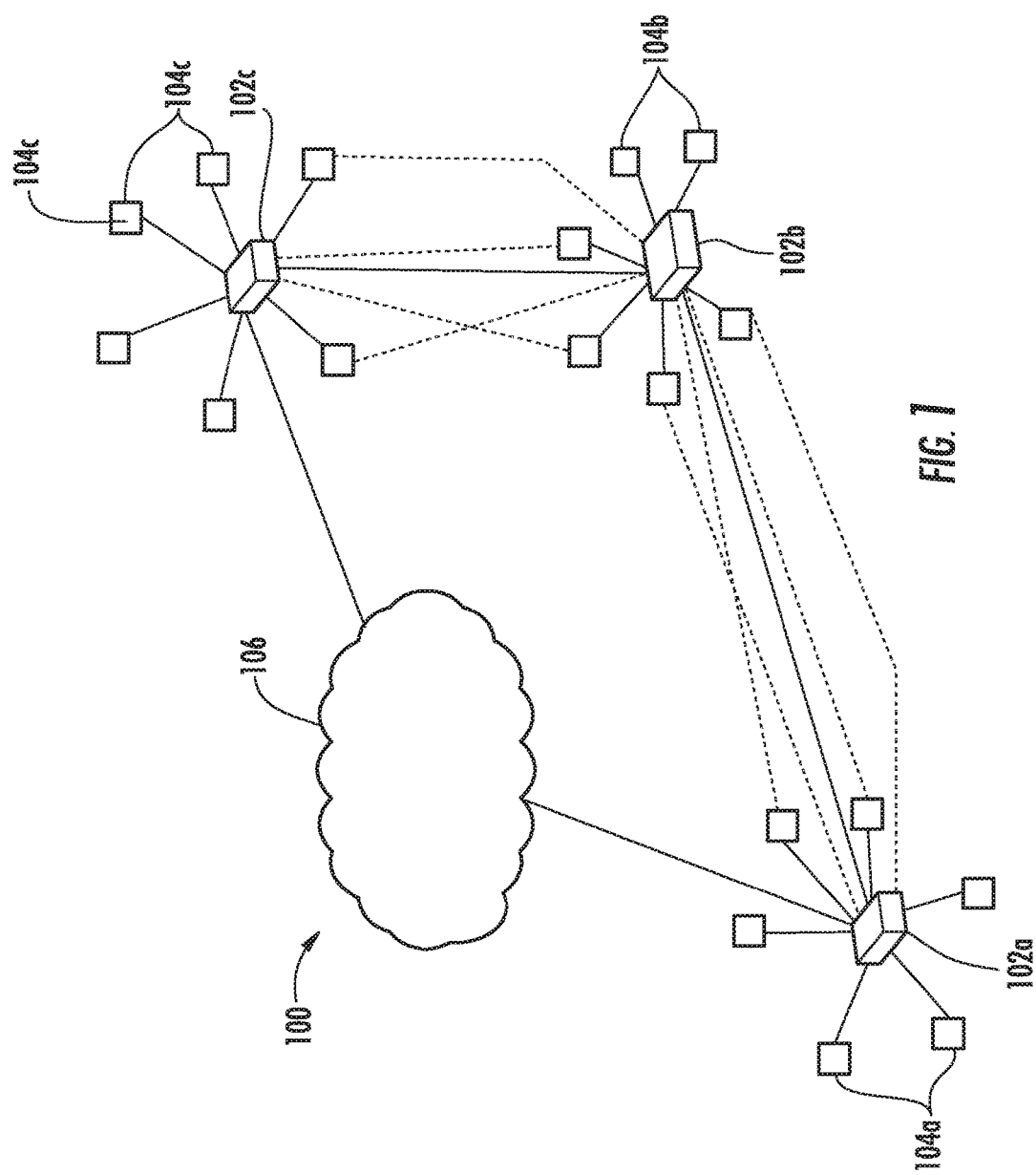
FIG. 1 is a schematic view of an exemplary embodiment of a network topology constructed in accordance with the present disclosure, showing a plurality of sensors and a plurality of edge router nodes.

Reference will now be made to the drawings wherein like reference numerals identify similar structural features or aspects of the subject disclosure. For purposes of explanation and illustration, and not limitation, a partial view of an exemplary embodiment of a network topology in accordance with the disclosure is shown in FIG. 1 and is designated generally by reference character 100. Other embodiments of the network topology in accordance with the disclosure, or aspects thereof, are provided in FIG. 2, as will be described.

FIG. 1 illustrates an exemplary embodiment of a network topology in accordance with the present disclosure. Network topology relates to the configuration of nodes which communicate with each other to comprise a system of communication for sharing and transmitting data packets. The network topology described herein can be used as a network communication system, such as a security system as will be shown and described in more detail. The system 100 including the disclosed network topology, as shown in FIG. 1, is comprised of a plurality of edge router nodes 102a-c and a plurality of sensors 104a-c. The edge router nodes 102a-c are used to relay information between a cloud server 106 and the sensors 104a-c. Each edge router node 102a-c is operatively connected to a plurality of sensors 104a-c, which may form a star around the edge router node 102. For example, sensors 104a may form a star around edge router node 102a. The communication between the edge router nodes 102a-c and between edge router nodes 102a-c and sensors 104a-c can be through wires or can be through wireless communication. The edge router nodes 102a-c are generally wall powered devices with battery backup power while the sensors 104a-c are generally battery powered. Every edge router node 102a-c is connected to a minimum of one other edge router node 102a-c if that edge router node 102a-c is connected to the cloud server 106. However, if the edge router node 102a-c is not connected to the cloud server 106, the edge router node 102a-c is connected to at least two edge router nodes 102a-c. As shown in FIG. 1, edge router nodes 102a and 102c are connected to the cloud server 106 and to edge router node 120b, respectively. Edge router node 102b is not connected to the cloud server and is connected to both edge router nodes 102a and 102c. Each sensor 104a-c is operatively connected to more than one, preferably two or more edge router nodes 102a-c. In this manner, if a sensor 104a-c loses connection with a main edge router node 102a-c, an alternate edge router node 102a-c can be used. For example, as shown in FIG. 1, a portion of sensors 104a are connected to edge router 102b. The main edge router nodes 102a-c connections (represented by a single line) and alternative edge router node connections 102a-c (represented by a dashed line) for a given sensor are defined by the edge router nodes 102a-c with strongest wireless link to a particular sensor 104a-c. For ease of illustration, a portion of the sensors 104a-c are shown connected to an alternate edge router node 102a-c. Those skilled in the art will understand that the remaining sensors 104a-c are also connected to a respective alternate edge router node as described.

Figure 2:
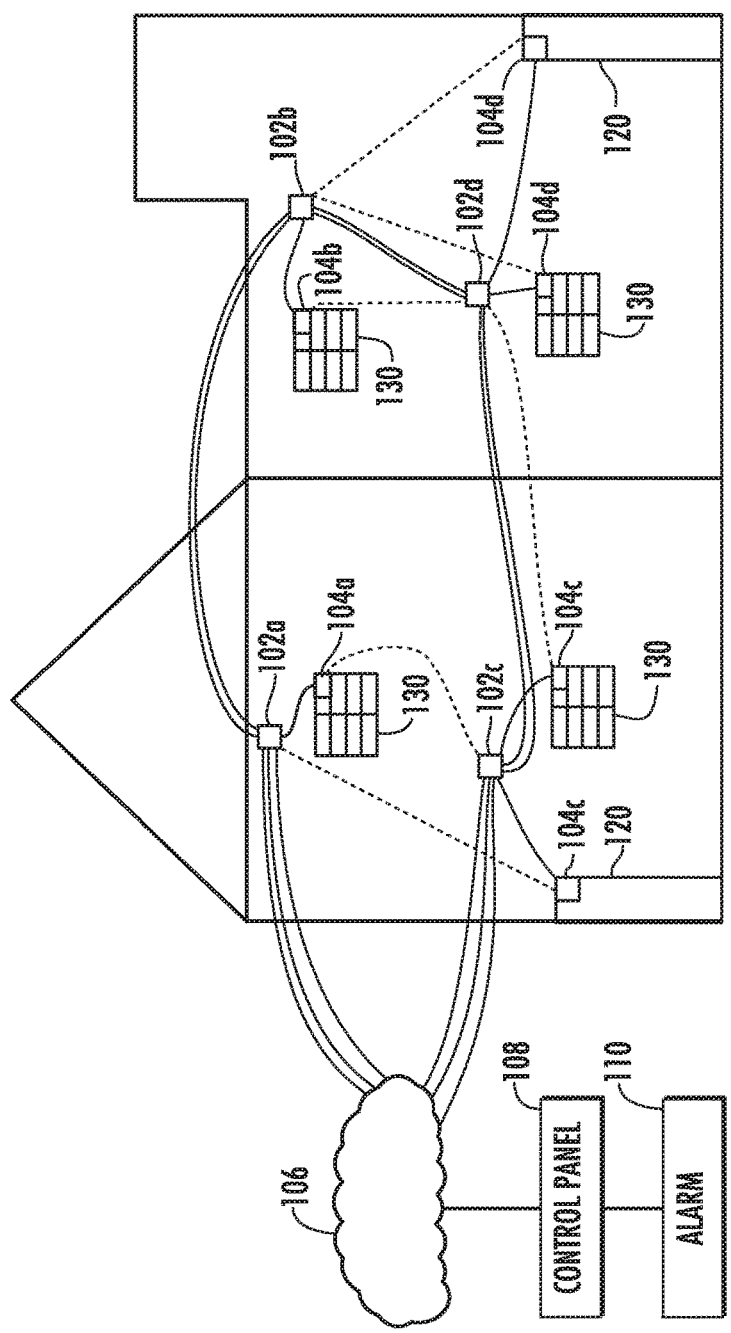
FIG. 2 is a schematic view of the network topology of FIG. 1 in use in a security system, showing a plurality of network devices.

Two or more of the edge router nodes 102a and 102c are operatively connected to a cloud server 106 for increased bandwidth and adding communication path redundancy compared to traditional systems, where a damaged edge router would cause total system failure. The cloud server 106 acts to receive and transmit information to and from each sensor 104a-c either within the system or to a central location. Having sensor 104a-c connected to more than one edge router node 102a-c and having plurality of edge router nodes 102a-c connected to at least one other edge router node 102a-c creates a more robust and reliable wireless network which allows for combined coverage compared to typical network topologies. Moreover, as regulations in certain frequency bands and markets require that sensors 104a-c communicating with other edge router nodes 102a-c can only transmit 2 s/hour, the disclosed network topology allows a greater number of sensors 104a-c to be connected through the disturbed edge router nodes 102a-c, which can communicate without restriction thereby allowing for increased speed in communication and relay of information. More specifically, as shown in FIG. 2, communication between edge router nodes 102a-d and sensors 104a-d (represented by a single line) remains at a ultra high frequency (UHF) band frequency, for example, 433 MHz, using 6LoWPAN (IPv6 over Low power Wireless Personal Area Networks) at 2 s/hour to follow regulation requirements. In certain embodiments, communication between sensors 104a-d and edge router nodes 102a-d can occur using frequency bands having no transmit time limitations, for example 2.4 GHz or 915 MHz bands in the U.S. and 2.4 GHz or 868 MHz in Europe, if a firmware upgrade or other communication requiring a wider bandwidth takes place. Edge router nodes 102a-d can communicate with other edge router nodes 102a-d (represented by a double line) at a higher data rate at a different frequency than the sensor 104a-d to edge router 102a-d frequency, for example, 800-900 MHz using 6LoWPAN with no time limit restrictions. Communication between edge router nodes 102a-d and the cloud server 106 can be through, but is not limited to, WiFi, Bluetooth, general packet radio service (GPRS) and public switched telephone network (PSTN). In this manner the same packet can go unmodified from the sensor to the cloud server. For example, if transmission from sensor to edge router node uses 6LoWPAN, transmission from edge router node to edge router node uses 6LoWPAN, and edge router to cloud uses IPv6. Those skilled in the art will readily understand that 6LoWPAN is one method for data delivery, however other known methods may be used without departing from the scope of the present disclosure.

With continued reference to FIG. 2, an exemplary embodiment of the system using the network topology of the present disclosure as a home security system having sensor nodes 104a-d in communication with an alarm 110 is illustrated. In this embodiment, edge router nodes 102a-d can be any device connected to wall power, for example, a light fixture, fan, humidifier, wall outlet, switch, or the like. Sensor nodes 104a-d are used for sensing a hazardous condition. For example, if a door 120 is left open, a window 130 is cracked open, and/or extreme heat from a fire is present. As shown in FIG. 2, a plurality of sensors 104a-d are operatively connected to at least two edge router nodes 102a-d to communicate detection of a hazardous condition from each sensor 104a-d. The communication between the sensors 104a-d and edge router nodes 102a-d are represented by a single line and/or dashed line to illustrate a main or alternate edge router node, respectively. The single lines and/or dashed lines also illustrate the limited transmission time and duty cycle between sensors 104a-d and edge router nodes 102a-d. Two or more edge router nodes 102a-d are connected to a cloud server 106 (represented by a triple line), which in turn is connected to a control panel 108 and the alarm 110. Edge router nodes 102b and 102d not connected to the cloud server are connected to other edge router nodes, as represented by a double line. The double line also illustrates no time limit for transmission between edge router nodes 102a-d. For ease of illustration, control panel 108 and alarm 110 are shown connected only to cloud server, however, in additional embodiments, control panel 108 can also be one of the edge router nodes 102a-d. In addition, cloud server 106 can communicate wirelessly to a standalone product, such as a mobile electronic device or a door lock. In use, when a sensor 104a-d senses a hazardous condition, i.e., a window 130 left open, sensor 104a-d transmits the data to the respective edge router node 102a-d. The edge router node 102a-d relays the message or data packet from the sensor 104a-d to the cloud server 106 which in turn transmits the information to the control panel 108 and control panel 108 sets off the alarm 110.

Those skilled in the art will readily understand the network topology is shown described for a home security system however other uses requiring data to be transmitted and shared throughout a secured network are contemplated without departing from the scope of the present disclosure. Moreover, while shown and described in the exemplary context of nodes as sensors those skilled in the art will readily appreciate that any other suitable type of device can be used as a node connected to edge routers without departing from the scope of the this disclosure.

The methods and systems of the present disclosure, as described above and shown in the drawings, provide for network communication with superior properties including advanced topology for a network. While the apparatus and methods of the subject disclosure have been shown and described with reference to preferred embodiments, those skilled in the art will readily appreciate that changes and/or modifications may be made thereto without departing from the spirit and scope of the subject disclosure.

What is claimed is:

1. A system for network topology, comprising:
   a plurality of physical edge router nodes including a first and a second edge router node;
   a plurality of first sensors operatively connected to the first edge router node;
   the second edge router node operatively connected to the first edge router node and to the plurality of first sensors; and
   a plurality of second sensors operatively connected to the second edge router node and to the first edge router node,
   wherein the first and second edge router nodes are each operatively connected to a physical cloud server through a respective cloud connection, so that in the event of one of the cloud connections becoming unavailable the plurality of first and second sensors in the system can remain operatively connected to the cloud server through the remaining cloud connection,
   wherein the first edge router node is a main edge router node to the first plurality of sensors and the second edge router node is an alternate edge router node to the first plurality of sensors,
   wherein the alternate edge router node is used when connection between the first plurality of sensors and the main edge router is lost, and
   wherein the network topology provides for each sensor of the first and second plurality of sensors to be connected to more than one edge router node of the plurality of edge router nodes, and each edge router node of the plurality of edge router nodes to be connected to at least one other edge router node of the plurality of edge router nodes.

2. The system of claim 1, wherein communication between sensor and edge router nodes occurs using frequency bands having transmit time limitations.

3. The system of claim 1, wherein communication between sensor and edge router nodes occur in frequency bands without transmit time limitations when communication requiring wider bandwidth takes place.

4. The system of claim 1, wherein the cloud connections are selected from the group consisting of WiFi, Bluetooth, GPRS and PSTN.

5. The system of claim 1, wherein communication between the edge router nodes occurs using frequency bands without transmit time limitations.

6. The system of claim 1, wherein the first and second edge router nodes are wall powered having a battery backup power.

7. The system of claim 1, wherein the plurality of first and second sensors are battery operated.

8. The system of claim 1, further comprising:
   a third edge router node operatively connected to at least the first and second edge router nodes; and
   a plurality of third sensors operatively connected to at least the third edge router node and one other edge router node.

9. The system of claim 1, further comprising:
   a third edge router node operatively connected to the cloud server and at least one other edge router node; and
   a plurality of third sensors operatively connected to at least the third edge router node and one other edge router node.

10. The system of claim 1, where the second edge router node is a main edge router node to the second plurality of sensors and the first edge router node is an alternate edge router node to the second plurality of sensors.

11. A system for network topology, comprising:
    a plurality of physical edge router nodes operatively connected to each other, including a first edge router node and a second edge router node wherein at least the first and second edge router nodes are operatively connected to a physical cloud server; and
    a plurality of sensors operatively connected to the plurality of edge router nodes, such that a first portion of the plurality of sensors are operatively connected to the first and second edge router nodes, wherein at least the first and second edge router nodes have a wireless link to the first portion of the plurality of sensors,
    wherein the first edge router node is a main edge router node to the first portion of the plurality of sensors and the second edge router node is an alternate edge router node to the first portion of the plurality of sensors,
    wherein the alternate edge router node is used when connection between the first portion of the plurality of sensors and the main edge router is lost, and
    wherein the network topology provides for each sensor of the first portion of the plurality of sensors and a second portion of the plurality of sensors to be connected to more than one edge router node of the plurality of edge router nodes, and each edge router node of the plurality of edge router nodes to be connected to at least one other edge router node of the plurality of edge router nodes.

12. The system of claim 11, wherein communication between sensors and edge routers occurs using frequency bands having transmit time limitations.

13. The system of claim 11, wherein communication between sensor and edge router nodes occur in frequency bands without transmit time limitations when communication requiring wider bandwidth takes place.

14. The system of claim 11, wherein communication between the edge router nodes occurs using frequency bands without transmit time limitations.

15. The system of claim 11, wherein the plurality of edge router nodes are wall powered.

16. The system of claim 11, wherein the plurality sensors are battery operated.

17. The system of claim 11, wherein each of the sensors are operatively connected to a main and alternate edge router node.

18. A system for network topology for a security and access authorization system, comprising:
- a plurality of physical edge router nodes including first and second edge router nodes operatively connected together;
- a plurality of first sensors operatively connected to the first and second edge router nodes;
- a plurality of second sensors operatively connected to the second edge router node and to the first edge router node,
- a physical cloud server operatively connected to the at least first and second edge router nodes through a respective cloud connection; and
- an alarm operatively connected to the cloud server,
- wherein in the event of one of the cloud connections becoming unavailable the plurality of first and second sensors in the system can remain operatively connected to the cloud server through the remaining cloud connection,
- wherein the first edge router node is a main edge router node to the first plurality of sensors and the second edge router node is an alternate edge router node to the first plurality of sensors,
- wherein the alternate edge router node is used when connection between the first plurality of sensors and the main edge router is lost, and
- wherein the network topology provides for each sensor of the first and second plurality of sensors to be connected to more than one edge router node of the plurality of edge router nodes, and each edge router node of the plurality of edge router nodes to be connected to at least one other edge router node of the plurality of edge router nodes.

19. The system of claim 18, wherein the at least one sensor senses a hazardous condition and communicates the hazardous condition to the alarm through the edge router nodes and the cloud server.

* * * * *